United States Patent
Kurabayashi

(10) Patent No.: US 9,158,593 B2
(45) Date of Patent: Oct. 13, 2015

(54) LOAD BALANCING SCHEME

(71) Applicant: Empire Technology Development LLC, Wilmington, DE (US)

(72) Inventor: Shuichi Kurabayashi, Fujisawa (JP)

(*) Notice: Subject to any disclaimer, the term of this patent is extended or adjusted under 35 U.S.C. 154(b) by 217 days.

(21) Appl. No.: 13/885,394

(22) PCT Filed: Dec. 17, 2012

(86) PCT No.: PCT/US2012/070063
§ 371 (c)(1),
(2) Date: May 14, 2013

(87) PCT Pub. No.: WO2014/098790
PCT Pub. Date: Jun. 26, 2014

(65) Prior Publication Data
US 2014/0173624 A1    Jun. 19, 2014

(51) Int. Cl.
*G06F 9/50* (2006.01)
*G06F 17/30* (2006.01)
*H04L 29/08* (2006.01)

(52) U.S. Cl.
CPC .............. *G06F 9/5083* (2013.01); *G06F 9/505* (2013.01); *H04L 67/1002* (2013.01); *G06F 17/30132* (2013.01); *G06F 17/30902* (2013.01); *G06F 2212/45* (2013.01)

(58) Field of Classification Search
None
See application file for complete search history.

(56) References Cited

U.S. PATENT DOCUMENTS

| | | |
|---|---|---|
| 2003/0158940 A1 | 8/2003 | Leigh |
| 2008/0091845 A1 | 4/2008 | Mills et al. |
| 2011/0078303 A1 | 3/2011 | Li et al. |
| 2011/0238948 A1 | 9/2011 | Vorbach et al. |
| 2012/0271964 A1 | 10/2012 | Porter |

OTHER PUBLICATIONS

Oracle Real Application Clusters (RAC) 11g Release 2, An Oracle White Paper Nov. 2010, 20 pages. http://www.oracle.com/technetwork/database/clustering/overview/index.html.
International Search Report from International Application No. PCT/US12/70063 mailed Feb. 26, 2013.
The Cisco Global Cloud Index Forecast and Methodology, 2010-2015 white paper, Nov. 29, 2011., http://www.cisco.com/en/US/solutions/collateral/ns341/ns525/ns537/ns705/ns1175/Cloud_Index_White_Paper.html.
Oracle Real Application Clusters, http://www.oracle.com/technetwork/database/clustering/overview/index.html, Nov. 2010.
Kazuo Goda, Takayuki Tamura, Masato Oguchi, Masaru Kitsuregawa: Run-Time Load Balancing System on SAN-connected PC Cluster for Dynamic Injection of CPU and Disk Resource—A Case Study of Data Mining Application. DEXA 2002: 182-192.

(Continued)

*Primary Examiner* — Qing Wu
(74) *Attorney, Agent, or Firm* — Brundidge & Stanger, P.C.

(57) ABSTRACT

Technologies are generally described for load balancing scheme in a cloud computing environment hosting a mobile device. In some examples, a load balancer may include multiple request processing units, each of the multiple request processing units comprising a network socket that is connected to at least one application server and at least one cache server and a programmable processor configured to process a cache request from one of the at least one application server, a performance checking unit configured to measure processing loads of the programmable processors, and a processor managing unit configured to adjust the processing loads by writing or deleting a load balancing program in at least one of the programmable processors.

24 Claims, 6 Drawing Sheets

(56) References Cited

OTHER PUBLICATIONS

P. H. W. Leong, "Recent Trends in FPGA Architectures and Applications," in 4th IEEE International Symposium on Electronic Design, Test and Applications (delta 2008), 2008, pp. 137-141.

J. Wang, Y. Xie, C. Zhu, Z. Zhao, and C. Han, "An Embedded Load Balancing System for High Speed OC192 Networks," in 2009 International Conference on Embedded Software and Systems, 2009, pp. 587-592.

L. Hark and A. Kayssi, "FPGA-based load balancer for Internet servers," in The 14th International Conference on Microelectronics, 2002, pp. 190-193.

V. V. Kindratenko, R. J. Brunner, and A. D. Myers, "Dynamic load-balancing on multi-FPGA systems: a case study," p. 8, Nov. 2007.

J. Phillips, M. Areno, B. Eames, and A. Dasu, "An FPGA-Based Dynamic Load-Balancing Processor Architecture for Solving N-body Problems," in Proc. of the 10th High-Performance Embedded Computing (HPEC), 2006.

LOAD BALANCING SCHEME

CROSS-REFERENCE TO RELATED APPLICATION

This Application is a U.S. National Stage Application filing under 35 U.S.C. §371 of International Application No. PCT/US12/70063, filed on Dec. 17, 2012.

BACKGROUND

Load balancing is a computer networking methodology to distribute workload across multiple computers or a computer cluster, network links, central processing units, disk drives, or other resources, to achieve optimal resource utilization, maximize throughput, minimize response time, and avoid overload. As applications by which a large number of users share data of a relatively large size on a cloud datacenter increase, a load balancer may be required to efficiently process data traffic between computation nodes and storage nodes.

SUMMARY

In an example, a load balancer may include multiple request processing units, each comprising a network socket that is connected to at least one application server and at least one cache server, and a programmable processor configured to process a cache request from one of the at least one application server. The load balancer further comprises a performance checking unit configured to measure processing loads of the programmable processors and a processor managing unit configured to adjust the processing loads by writing or deleting a load balancing program in at least one of the programmable processors.

In another example, a method performed under control of a load balancer including multiple programmable processors may include receiving a cache request from one of at least one application server; writing, into one of the plurality of programmable processors, a load balancing program that handles the cache request by designating one of at least one cache server; and transmitting, to the one of the at least one application server, an address of the one of the at least one cache server corresponding to the cache request.

In yet another example, a computer-readable storage medium may store thereon computer-executable instructions that, in response to execution, cause a load balancer including multiple programmable processors to perform operations including receiving a cache request from one of at least one application server; writing, into one of the plurality of programmable processors, a load balancing program that handles the cache request by designating one of at least one cache server; and transmitting, to the one of the at least one application, server an address of the one of the at least one cache server corresponding to the cache request.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
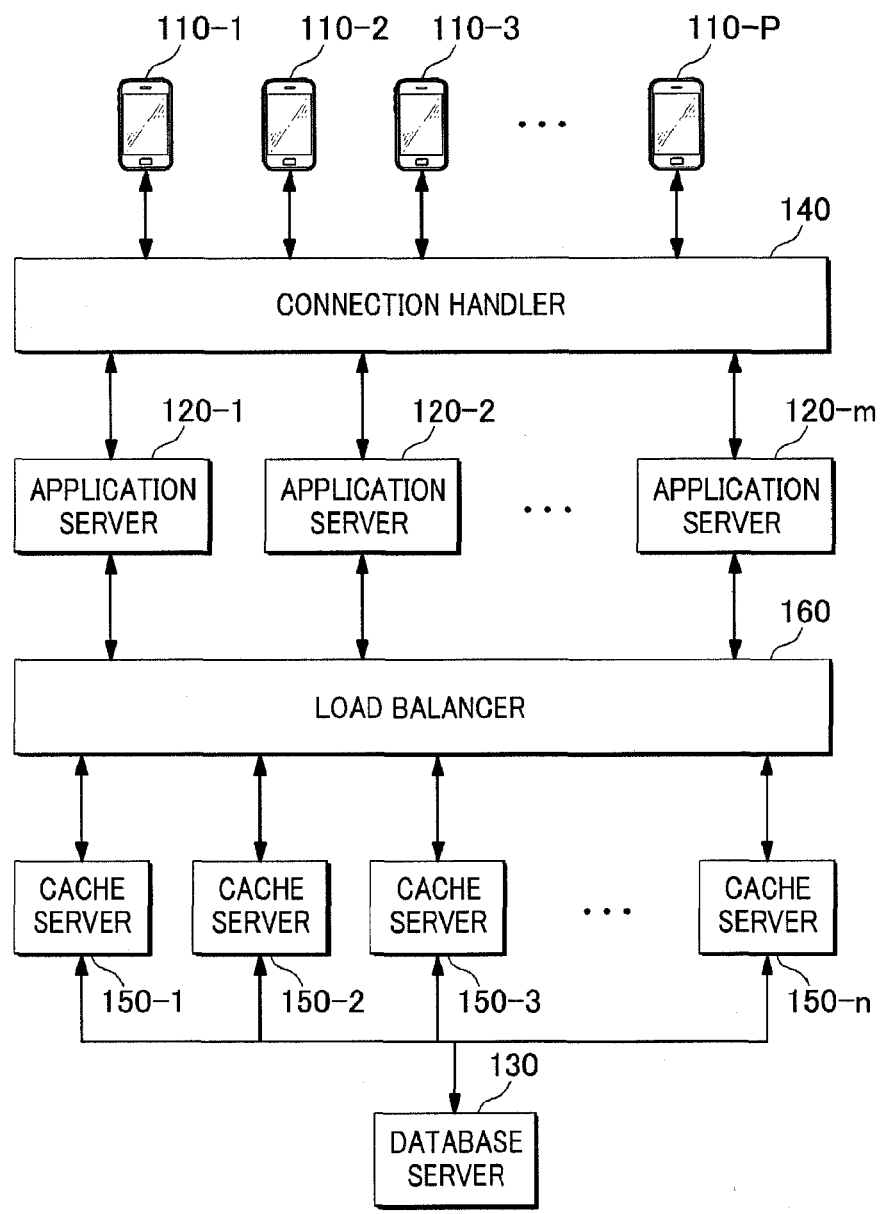
FIG. 1 schematically shows an illustrative example of an environment in which a load balancer provides a load balancing scheme between multiple application servers and multiple cache servers, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a load balancing scheme. Further, technologies are generally described for a load balancer configured to provide load balancing between multiple application servers and multiple cache servers.

In some embodiments, a cloud-based network system may include at least three server layers including, for example, multiple application servers configured to handle requests from user devices, multiple cache servers configured to handle data caching for the multiple application servers, and a cloud database server configured to store and provide data for use by the multiple application servers. In such cases, a load balancer may be configured to balance loads between the multiple application servers and the multiple cache servers to resolve a communication bottleneck between the multiple application servers and the multiple cache servers.

The load balancer may employ thereon multiple programmable processors, which are connected to respective network sockets. The load balancer may dynamically write a load balancing program for performing load balancing into one of the programmable processors. In some embodiments, an application may be executed through one of the multiple application servers, and the one of the multiple application servers may request of the load balancer data regarding the running of the application. In such cases, the load balancer may write into one of the programmable processors a load balancing program, which is an application-specific program according to one or more characteristics of the application. The one or more characteristics of the application may be decided by the type of the application (e.g., whether the application is an e-mail application, a game application, an SNS service providing application, an e-book application, a map application, a video playing application, etc.). By way of example, but not limitation, video playing applications or game applications may be characterized that they require more data transmission than e-mail applications and SNS service providing applications. The load balancing program may be required to handle the application considering such characteristics.

By way of example, but not limitation, when the user device runs an application for playing a video that is stored in the cloud database server, a corresponding application server may request of the load balancer the video that is stored in the cloud database server. Then, the load balancer may write into one of the multiple programmable processors a load balancing program of a type adapted to cache the video in one of the multiple cache servers thus making it possible for the user device to play the video smoothly. In some other examples, when the user device run an application for a social networking service (or "SNS") via a corresponding application server, the load balancer may proactively write into one of the multiple programmable processors a load balancing program of a type that is adapted to preferentially store information data viewed by a greater number of users in one the multiple cache servers. By way of such customized load balancing, it may be possible to efficiently manage data caching according to one or more characteristics of the application.

In some embodiments, the load balancer may measure a processing load of each of the multiple programmable processors. When the processing load is concentrated on a specific programmable processor, the load balancer may increase the number of programmable processors for the processing load by writing a corresponding load balancing program into one or more of the multiple programmable processors. Alternatively, when the programmable processor for the processing load exhibits low load balancing cost, that is, when a surplus calculation power of the programmable processor is great, the load balancer may reduce the number of programmable processors for the processing load. In this way, the number of programmable processors allocated to a specific processing load may be automatically adjusted.

FIG. 1 schematically shows an illustrative example of an environment in which a load balancer provides a load balancing scheme between multiple application servers and multiple cache servers, arranged in accordance with at least some embodiments described herein. As depicted in FIG. 1, one of user devices 110-1, 110-2, 110-3, . . . , 110-$p$ may send to one of application servers 120-1, 120-2, . . . , 120-$m$ a request for application-related data, which may be stored in a database server 130, via a connection handler 140. Further, one of cache servers 150-1, 150-2, . . . , 150-$n$ may cache the application-related data from database server 130, and a load balancer 160 may process the request for application-related data. By way of example, but not limitation, the request may include an HTTP (Hypertext Transfer Protocol) request such as, for example, an HTTP GET request or an HTTP POST request.

In some embodiments, connection handler 140 may allocate or assign the request from the one of user devices 110-1, 110-2, 110-3, . . . , 110-$p$ to the appropriate one of application servers 120-1, 120-2, . . . , 120-$m$. In some embodiments, connection handler 140 may allocate or assign the request based at least in part on processing loads of application servers 120-1, 120-2, . . . , 120-$m$.

In some embodiments, database server 130 may store data for various applications, and cache servers 150-1, 150-2, . . . , 150-$n$ may cache at least some of the data stored in database server 130. By way of example, but not limitation, database server 130 may be a cloud datacenter, and cache servers 150-1, 150-2, . . . , 150-$n$ may be in-memory cache servers.

In some embodiments, a load balancer 160 may employ thereon multiple programmable processors (not shown in FIG. 1), which may be respectively connected to network sockets (not shown in FIG. 1). Load balancer 160 may dynamically write a load balancing program for performing load balancing into one of the multiple programmable processors. In such cases, the load balancing program may be an application-specific program corresponding to one or more characteristics of the application. The load balancing program may be a program that determines how to store data in cache servers 150-1, 150-2, . . . , 150-$n$. Since a single cache server store data beyond the memory storage capacity, multiple cache servers 150-1, 150-2, . . . , 150-$n$ are employed. In order to improve responsiveness to the application, the data likely to be used for cache servers 150-1, 150-2, . . . , 150-$n$ may be selectively maintained in the cache memory. However, because it may be difficult to predict how long certain data will go unused by an application, load balancer 160 may perform the load balancing using the load balancing program that reflects the one or more characteristics of the application. By way of example, but not limitation, the one or more characteristics may include data access tendency of the application, which may refer to how often the application requests data stored in database server 130, or what kind of data (e.g., a document, an audio, a video, an image, etc.) the application requests from database server 130.

In some embodiments, load balancer 160 may automatically measure a load of each of the multiple programmable processors. When a load of a specific programmable processor (which is processing a request from an application) exceeds a threshold value (e.g., when the load balancing cost exceeds I/O cost and/or application cost), the number of programmable processors assigned to the request from the application may be increased. But when the programmable processor processing the request from the application shows a low load balancing cost (i.e., the surplus calculation power of the programmable processors is great), the number of programmable processors allocated to the load balancing process of the application may be decreased. In this way, the number of programmable processors allocated to each application can be adjusted automatically.

Figure 2:
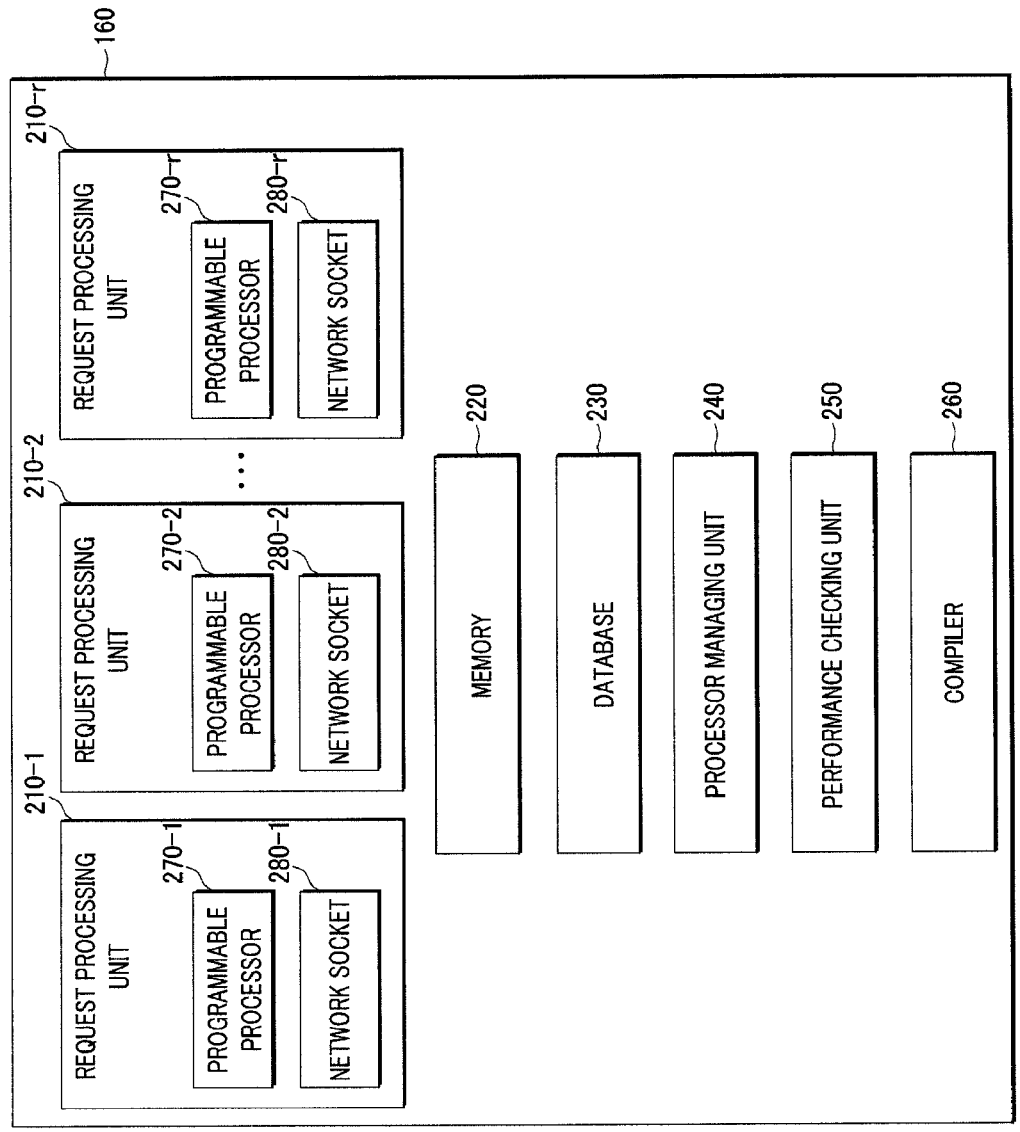
FIG. 2 shows a schematic block diagram of an illustrative example of a load balancer, arranged in accordance with at least some embodiments described herein.

FIG. 2 shows a schematic block diagram of an illustrative example of load balancer 160, arranged in accordance with at least some embodiments described herein. As depicted, load balancer 160 may include multiple request processing units 210-1, 210-2, . . . , 210-$r$, a memory 220, a database 230, a processor managing unit 240, a performance checking unit 250 and a compiler 260. Although illustrated as discrete components, various components may be divided into additional components, combined into fewer components, or eliminated altogether while being contemplated within the scope of the disclosed subject matter.

Each of request processing units 210-1, 210-2, . . . , 210-$r$ may include a programmable processor 270-1, 270-2, . . . , or 270-$r$ and a network socket 280-1, 280-2, . . . , or 280-$r$. Each of programmable processors 270-1, 270-2, . . . , 270-$r$ may be configured to process a cache request from one of application servers 120-1, 120-2, . . . , 120-m. In some embodiments, each of programmable processors 270-1, 270-2, . . . , 270-4 may analyze the cache request as to its characteristics and, as will be described below in more details, provide the analysis results to processor managing unit 240 so that processor managing unit 240 may select a load balancing program that is adapted to process the cache request according to the characteristics. By way of example, but not limitation, programmable processors 270-1, 270-2, . . . , 270-r may be an FPGA (Field Programmable Gate Array). Each of network sockets 280-1, 280-2, . . . , 280-r may be connected to one or more of application servers 120-1, 120-2, . . . , 120-m and one or more of cache servers 150-1, 150-2, . . . , 150-n.

Memory 220 may store multiple load balancing programs for processing a cache request from one or more of application servers 120-1, 120-2, . . . , 120-m. By way of example, but not limitation, the multiple load balancing programs may be application-specific programs according to one or more characteristics of applications. Each of the load balancing programs determines how to store data in one or more of cache servers 150-1, 150-2, . . . , 150-n.

In some embodiments, each of network sockets 280-1, 280-2, . . . , 280-r may receive a cache request from one or more of application servers 120-1, 120-2, . . . , 120-m, and each of programmable processors 270-1, 270-2, . . . , 270-r may analyze the cache request. By way of example, but not limitation, programmable processors 270-1, 270-2, . . . , 270-r may analyze the cache request and check whether there exists a cache server (among cache servers 150-1, 150-2, . . . , 150-n) in which data related to the cache request is stored. If there is a cache server that stores the data related to the cache request, an IP address of the corresponding cache server (among cache servers 150-1, 150-2, . . . , 150-n) is returned to the one or more of application servers 120-1, 120-2, . . . , 120-m. On the other hand, if there is no cache server that stores the data corresponding to the cache request, a value of NULL is returned to the one or more of application servers 120-1, 120-2, . . . , 120-m.

Database 230 may be configured to record information regarding a relationship between the cache request and the cache server (among cache servers 150-1, 150-2, . . . , 150-n) that stores the data corresponding to the cache request. By way of example, but not limitation, when cache server 150-1 stores data related to a cache request from application server 120-1, a data packet of relationship information including the cache request, an TP address of application server 120-1 and an IP address of cache server 150-1 may be recorded in database 230.

Processor managing unit 240 may adjust the processing loads by writing or deleting a load balancing program in one or more of programmable processors 270-1, 270-2, . . . , 270-r. In some embodiments, when the value NULL is returned because there is no cache server corresponding to the cache request, processor managing unit 240 may write into one of programmable processors 270-1, 270-2, . . . , 270-r a load balancing program that handles the cache request by designating one or more of cache servers 150-1, 150-2, . . . , 150-n. Thereafter, the corresponding programmable processor (among programmable processors 270-1, 270-2, . . . , 270-r) may send one or more IP addresses of the one or more of cache servers 150-1, 150-2, . . . , 150-n to the one of application servers 120-1, 120-2, . . . , 120-m that transmitted the cache request.

In some embodiments, the load balancing program written into the one of programmable processors 270-1, 270-2, . . . , 270-r by processor managing unit 240 may be an application-specific program determined based at least in part on an analysis of the cache request by the one of programmable processors 270-1, 270-2, . . . , 270-r. By way of non-limiting example, the one of programmable processors 270-1, 270-2, . . . , 270-r may analyze the cache request and determine that the cache request relates to a video transmission service, and processor managing unit 240 may proactively write into the one of programmable processors 270-1, 270-2, . . . , 270-r a load balancing program (among the multiple load balancing programs stored in memory 220) of a type adapted to store the moving picture in a cache server.

Performance checking unit 250 may be configured to measure processing loads of programmable processors 270-1, 270-2, . . . , 270-r. In some embodiments, performance checking unit 250 may compare a processing load of each of programmable processors 270-1, 270-2, . . . , 270-r with a predetermined value. By way of example, but not limitation, the predetermined value may be either an I/O cost or an application cost, whichever is smaller, or may be the sum of the I/O cost and the application cost. Processing managing unit 240 may then adjust the load of each programmable processors 270-1, 270-2, . . . , 270-r based at least part on the comparison. That is, performance checking unit 250 may measure a throughput of each of programmable processors 270-1, 270-2, . . . , 270-r, and if a delay of a certain amount of time is detected, processing managing unit 240 may change the number of programmable processors 270-1, 270-2, . . . , 270-r assigned to the corresponding application.

Compiler 260 may translate the load balancing program into a bitstream representing configuration information of programmable processors 270-1, 270-2, . . . , 270-r. In some embodiments, in response to a request from performance checking unit 250, processor managing unit 240 may acquire, from memory 220, a load balancing program for an application and write the load balancing program in one or more of programmable processor 270-1, 270-2, . . . , 270-r. By way of example, but not limitation, compiler 260 may translate the load balancing program written by HDL into a bitstream representing configuration information of the one or more of programmable processors 270-1, 270-2, . . . , 270-r.

Figure 3:
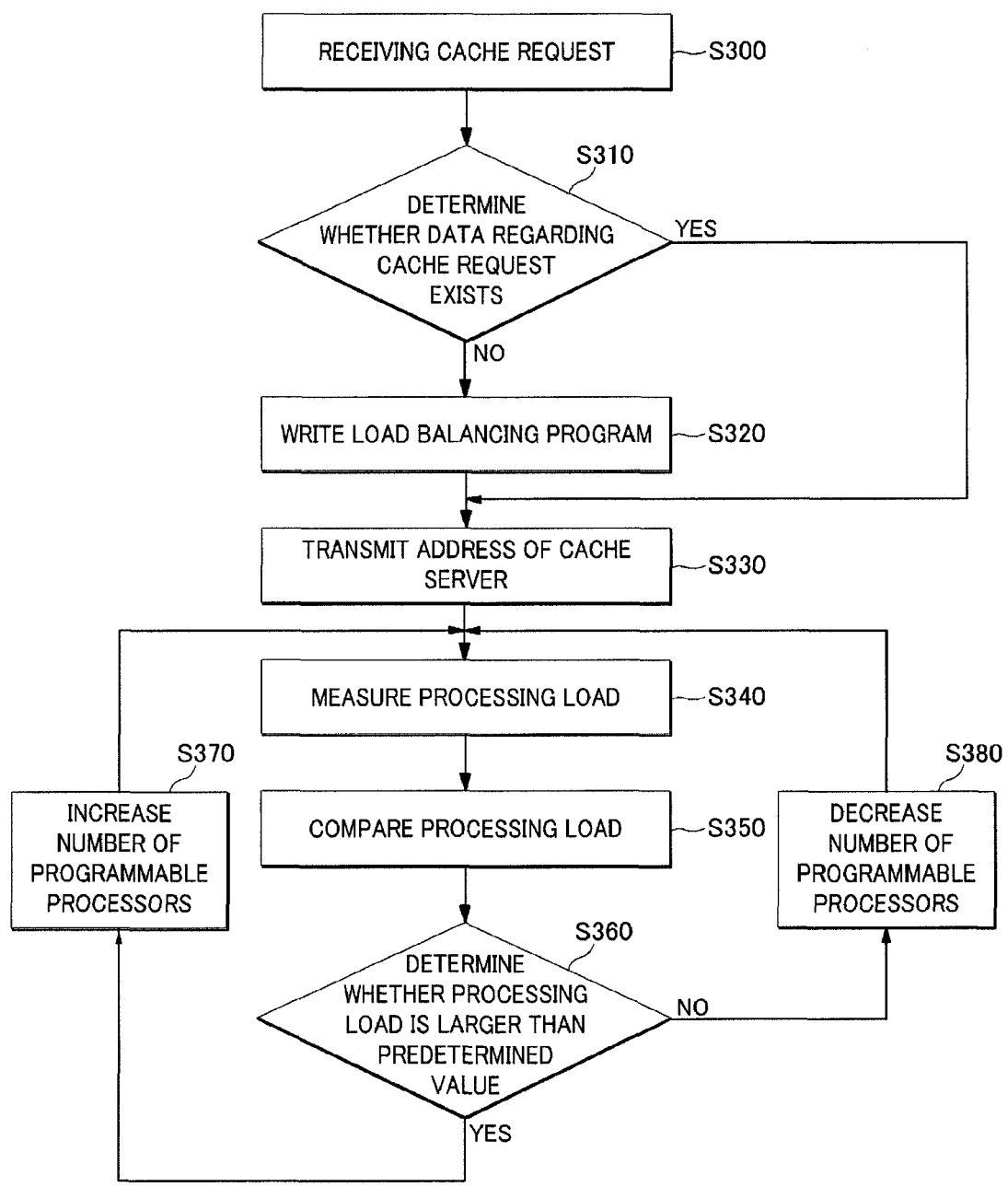
FIG. 3 shows an example flow diagram of a process for providing a load balancing scheme, arranged in accordance with at least some embodiments described herein.

FIG. 3 shows an example flow diagram of a process for providing a load balancing scheme, arranged in accordance with at least some embodiments described herein. The method in FIG. 3 may be implemented in or by load balancer 160, which may include multiple request processing units 210-1, 210-2, . . . , 210-r, a memory 220, a database 230, a processor managing unit 240, a performance checking unit 250 and a compiler 260 discussed above. An example process may include one or more operations, actions, or functions as illustrated by one or more blocks S300, S310, S320, S330, S340, S350, S360, S370 and/or S380. Although illustrated as discrete blocks, various blocks may be divided into additional blocks, combined into fewer blocks, or eliminated, depending on the desired implementation. In the below description with regard to FIG. 3, the process will be described mainly using request processing unit 210-1 (including programmable processor 270-1 and network socket 280-1), application server 120-1 and cache server 150-1 for the convenience of explanation. However, one skilled in the art would appreciate that the process can also be implemented by other components. Processing may begin at block S300.

At block S300 (Receiving Cache Request), request processing unit 210-1 may receive a cache request from application server 120-1 through network socket 280-1. By way of example, but not limitation, the cache request may include an HTTP (Hypertext Transfer Protocol) request such as, for example, an HTTP GET request or an HTTP POST request. Processing may continue from block S300 to block S310.

At decision block S310 (Determine Whether Data Regarding Cache Request Exists), request processing unit 210-1 may determine whether the data corresponding to the cache request exists in cache servers 150-1, 150-2, ..., 150-n. Processing may continue from block S310 to block S320, upon a negative determination, or to block S330, upon a positive determination.

At block S320 (Write Load Balancing Program), when it is determined that data regarding the cache request does not exist in cache servers 150-1, 150-2, ..., 150-n, processor managing unit 240 may write a load balancing program that may handle the cache request into programmable processor 270-1 by designating cache server 150-1, which is available for handling the cache request. Processing may continue from block S320 to block S330.

At block S330 (Transmit Address of Cache Server), programmable processor 270-1 may transmit, to application server 120-1, an address of cache server 150-1 designated by programmable processor 270-1. In some embodiments, if the data regarding the cache request exists in one of cache servers 150-1, 150-2, ..., 150-n, programmable processor 270-1 may transmit, to application server 120-1, an address of the one of cache servers 150-1, 150-2, ..., 150-n that stores the data regarding the cache request. Processing may continue from block S330 to block S340.

At block S340 (Measure Processing Load), performance checking unit 250 may measure a processing load of programmable processor 270-1. Processing may continue from block S340 to block S350.

At block S350 (Compare Processing Load), performance checking unit 250 may compare the processing load with a predetermined value. Processing may continue from block S350 to block S360.

At block S360 (Determine Whether Processing Load is Larger Than Predetermined Value), performance checking unit 250 may determine whether the processing load is larger than the predetermined value. By way of example, but not limitation, the predetermined value may be either an I/O cost or an application cost, whichever is smaller, or may be the sum of the I/O cost and the application cost. Processing may continue from block S360 to block S370 or S380.

At block S370 (Increase Number of Programmable Processors), if the processing load is larger than the predetermined value, processor managing unit 240 may increase the number of programmable processors assigned to the cache request from application server 120-1. In some embodiments, processor managing unit 240 may increase the number of programmable processors for the cache request by simply copying the loading balancing program from programmable processor 270-1 and writing it into another programmable processor. By way of example, but not limitation, compiler 260 may translate the load balancing program written by HDL into a bitstream representing configuration information of the other programmable processor.

At block S380 (Decrease Number of Programmable Processors), if the processing load is not larger than the predetermined value, processor managing unit 240 may decrease the number of programmable processors assigned to the cache request from application server 120-1. In some embodiments, processor managing unit may decrease the number of programmable processors for the cache request by simply deleting the load balancing program in programmable processor 270-1.

Figure 4:
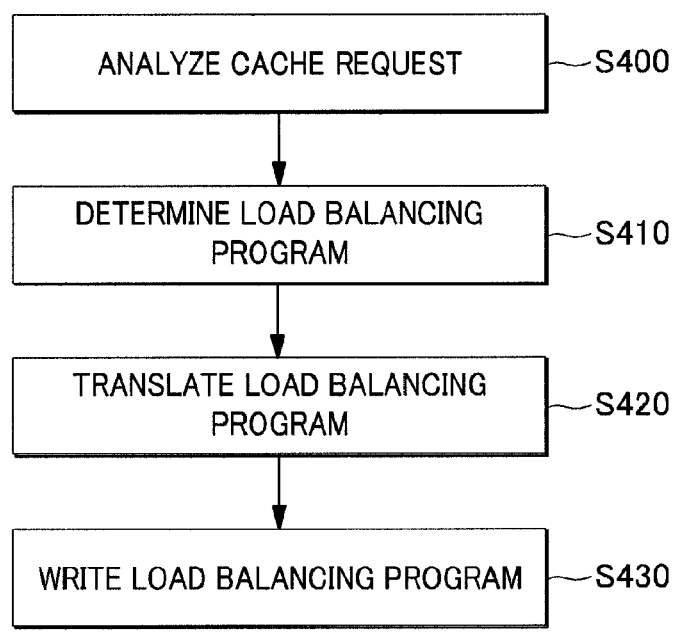
FIG. 4 shows an example flow diagram of a process for writing a load balancing program into a programmable processor, arranged in accordance with at least some embodiments described herein.

FIG. 4 shows an example flow diagram of a process for writing a load balancing program into a programmable processor, arranged in accordance with at least some embodiments described herein. The method in FIG. 4 may be implemented in or by load balancer 160, which may include multiple request processing units 210-1, 210-2, ..., 210-r, a memory 220, a database 230, a processor managing unit 240, a performance checking unit 250 and a compiler 260 discussed above. An example process may include one or more operations, actions, or functions as illustrated by one or more blocks S400, S410, S420 and/or S430. Those blocks are sub-blocks of block S320 of FIG. 3, and thus, the below description may be related with and/or based on the above description with regard to FIG. 3. Although illustrated as discrete blocks, various blocks may be divided into additional blocks, combined into fewer blocks, or eliminated, depending on the desired implementation. Processing may begin at block S400.

At block S400 (Analyze Cache Request), programmable processor 270-1 may analyze the cache request from application server 120-1. Processing may continue from block S400 to block S410.

At block S410 (Determine Load Balancing Program), processor managing unit 240 may select a load balancing program from the multiple load balancing programs stored in memory 220 based at least in part on the analysis of programmable processor 270-1. By way of example, but not limitation, when the cache request is related with an SNS service (as a result of the analysis), processor managing unit 240 may choose a load balancing program of a type adapted to preferentially cache information used and/or subscribed by a greater number of users in a cache server. Processing may continue from block S410 to block S420.

At block S420 (Translate Load Balancing Program), compiler 260 may translate the load balancing program selected by processor managing unit 240 into a bitstream representing configuration information of programmable processor 270-1. Processing may continue from block S420 to block S430.

At block S430 (Write Load Balancing Program), processor managing unit 240 may write into programmable processor 270-1 the load balancing program determined by processor managing unit 240 and translated by compiler 260.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
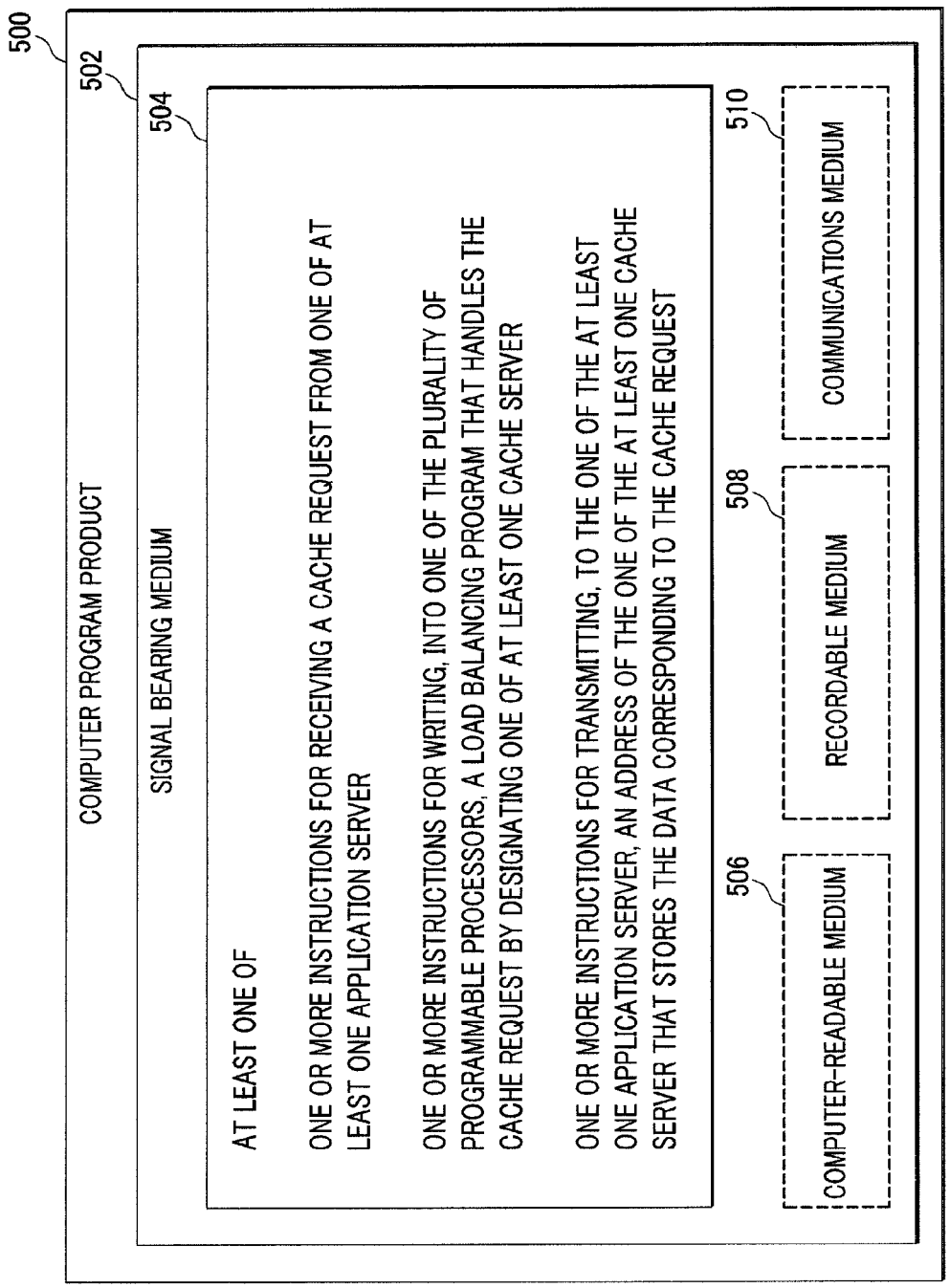
FIG. 5 illustrates computer program products that may be utilized to provide a load balancing scheme, arranged in accordance with at least some embodiments described herein.

FIG. 5 illustrates computer program products that may be utilized to provide a load balancing scheme, arranged in accordance with at least some embodiments described herein. Program product 500 may include a signal bearing medium 502. Signal bearing medium 502 may include one or more instructions 504 that, when executed by, for example, a processor, may provide the functionality described above with respect to FIGS. 1-4. By way of example, instructions 504 may include: one or more instructions for receiving a cache request from one of at least one application server, writing, into one of the plurality of programmable processors, a load balancing program that handles the cache request by designating one of at least one cache server, and transmitting, to the one of the at least one application server, an address of the one of the at least one cache server that stores the data corresponding to the cache request. Thus, for example, referring to FIG. 2, load balancer 160 may undertake one or more of the blocks shown in FIG. 3 in response to instructions 504.

In some implementations, signal bearing medium 502 may encompass a computer-readable medium 506, including, but not limited to, a hard disk drive, a CD, a DVD, a digital tape, memory, etc. In some implementations, signal bearing medium 502 may encompass a recordable medium 508, including, but not limited to, memory, read/write (R/W) CDs, R/W DVDs, etc. In some implementations, signal bearing medium 502 may encompass a communications medium 510, including, but not limited to, a digital and/or an analog communication medium (e.g., a fiber optic cable, a waveguide, a wired communications link, a wireless communication link, etc.). Thus, for example, program product 500 may be conveyed to one or more modules of load balancer 160 by an RF signal bearing medium 502, where the signal bearing medium 502 is conveyed by a wireless communications medium 510 (e.g., a wireless communications medium conforming with the IEEE 702.11 standard).

Figure 6:
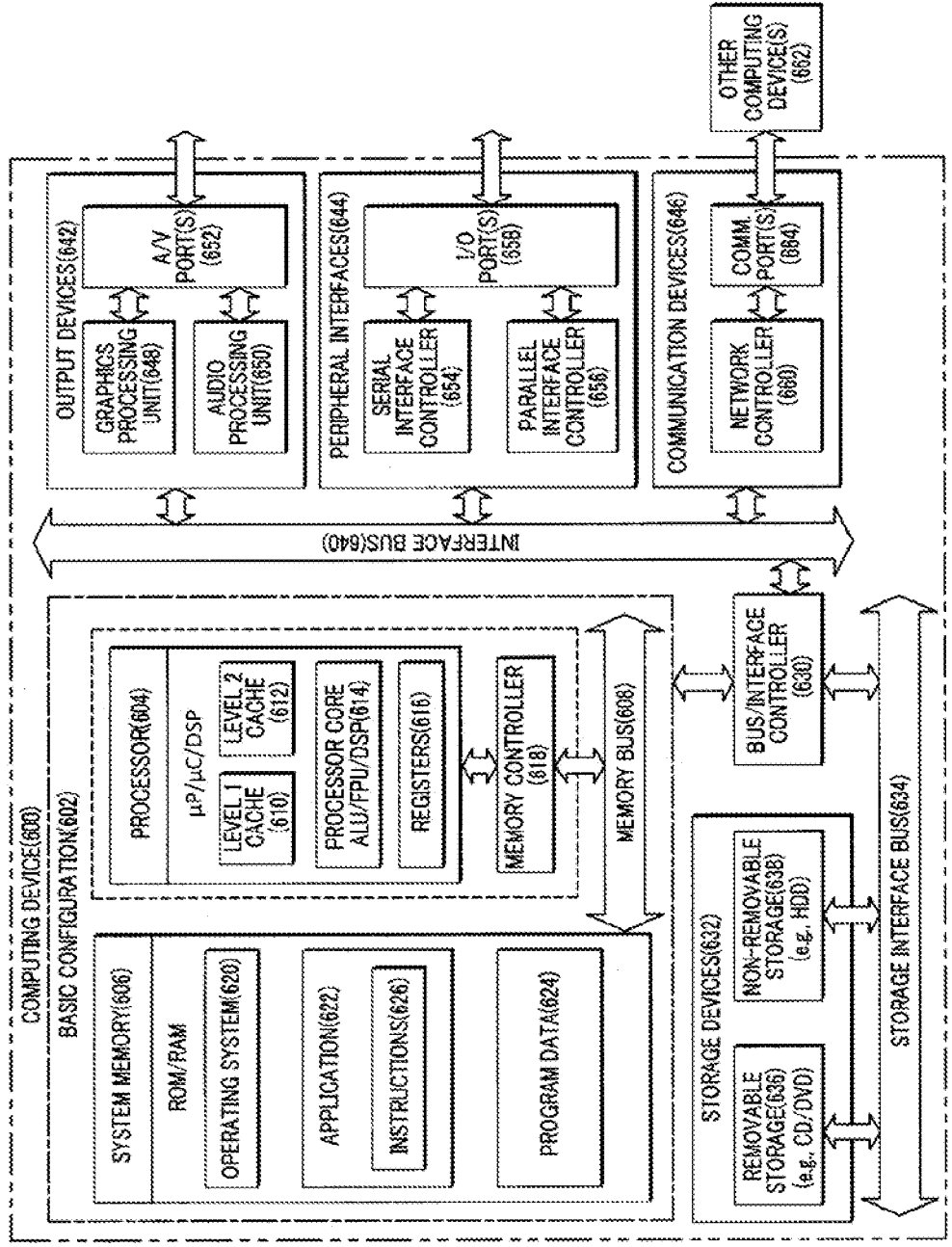
FIG. 6 is a block diagram illustrating an example computing device that may be utilized to provide a load balancing scheme, arranged in accordance with at least some embodiments described herein.

FIG. 6 is a block diagram illustrating an example computing device that may be utilized to provide a load balancing scheme, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include instructions 626 that may be arranged to perform the functions as described herein including the actions described with respect to the load balancer 160 architecture as shown in FIG. 3 or including the actions described with respect to the flow charts shown in FIGS. 3 and 4. In some examples, application 622 may be arranged to operate with program data 624 on an operating system 620 such that implementations for instructions for an electronic device as described herein.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A load balancer, comprising:
a plurality of request processing units, each of the plurality of request processing units comprising:
a network socket that is connected to at least one application server and at least one cache server, and
a programmable processor configured to process a cache request from one of the at least one application server;
a performance checking unit configured to measure processing loads of the programmable processor; and
a processor managing unit configured to adjust the measured processing loads by writing or deleting a load balancing program in at least one of the programmable processors.

2. The load balancer of claim 1, wherein the programmable processor is an FPGA (Field Programmable Gate Array).

3. The load balancer of claim 1, further comprising:
a memory configured to store a plurality of load balancing programs,
wherein the network sockets are each configured to receive the cache request and the programmable processors are further configured to analyze the cache request, and
wherein the processor managing unit is further configured to select the load balancing program from the plurality of load balancing programs based at least in part on the analysis of the cache request.

4. The load balancer of claim 1, wherein the programmable processors are further configured to check whether data corresponding to the cache request exists in the at least one cache server.

5. The load balancer of claim 4, wherein the programmable processors are further configured, responsive to a determination that the data corresponding to the cache request exists in the at least one cache server, to transmit, to the one of the at least one application server, an address of the cache server that stores the data corresponding to the cache request.

6. The load balancer of claim 5, further comprising:
a database configured to record relationship information of the cache request and the cache server that stores the data corresponding to the cache request.

7. The load balancer of claim 4, wherein the processor managing unit is further configured, responsive to a determination that the data corresponding to the cache request exists in the at least one cache server, to write in one of the programmable processors the load balancing program that handles the cache request by designating one of the at least one cache server, and
wherein the one of the programmable processors is configured to transmit, to the one of the at least one application server, an address of the one of the at least one cache server designated by the load balancing program.

8. The load balancer of claim 1, wherein the performance checking unit is further configured to compare processing load of each of the programmable processors with a predetermined value, and
wherein the processing managing unit is further configured to adjust the load of each of the programmable processors based at least part on the comparison.

9. The load balancer of claim 1, wherein the at least one cache server is connected to a cloud datacenter.

10. The load balancer of claim 1, further comprising:
a compiler configured to translate the load balancing program into a bitstream representing configuration information of the at least one of the programmable processors, and
wherein the processor managing unit is further configured to write the bitstream in the at least one of the programmable processors.

11. A method performed under control of a load balancer including a plurality of programmable processors, comprising:
receiving a cache request from one of at least one application server;
measuring processing load of each of the plurality of programmable processors;
writing, into one of the plurality of programmable processors, a load balancing program that adjusts the processing load based at least in part on the measured processing load, the load balancing program handling the cache request by designating one of at least one cache server; and
transmitting, to the one of the at least one application server, an address of the one of the at least one cache server corresponding to the cache request.

12. The method of claim 11, further comprising:
determining whether the data corresponding to the cache request exists in the at least one cache server.

13. The method of claim 11, further comprising:
comparing the processing load with a predetermined value; and adjusting the processing load based at least in part on the comparing.

14. The method of claim 13, wherein the adjusting comprises writing the load balancing program into at least one of the plurality of programmable processors.

15. The method of claim 11, wherein the programmable processor is an FPGA (Field Programmable Gate Array).

16. The method of claim 11, wherein the at least one cache server is connected to a cloud datacenter.

17. The method of claim 11, further comprising:
recording, in a database of the load balancer, relationship information of the cache request and the one of the at least one cache server.

18. The method of claim 11, further comprising:
analyzing the cache request; and
determining the load balancing program from a plurality of load balancing programs based at least in part on the analyzing.

19. The method of claim 11, further comprising:
translating the load balancing program into a bitstream representing configuration information of the one of the plurality of programmable processors,
wherein the writing includes writing the bitstream into the one of the plurality of programmable processors.

20. A computer-readable storage medium having stored thereon computer-executable instructions that, in response to execution, cause a load balancer including a plurality of programmable processors to perform operations, comprising:
receiving a cache request from one of at least one application server;
measuring processing load of each of the plurality of programmable processors;
writing, into one of the plurality of programmable processors, a load balancing program that adjusts the processing load based at least in part on the measured processing load, the load balancing program handles the cache request by designating one of at least one cache server; and
transmitting, to the one of the at least one application, server an address of the one of the at least one cache server corresponding to the cache request.

21. The computer-readable storage medium of claim 20, wherein the programmable processor is an FPGA (Field Programmable Gate Array).

22. The computer-readable storage medium of claim 20, wherein the operations further comprise:
comparing the processing load with a predetermined value; and
adjusting the processing load based at least in part on the comparing.

23. The computer-readable storage medium of claim 22, wherein the adjusting comprises writing the load balancing program into at least one of the plurality of programmable processors.

24. The computer-readable storage medium of claim 20, wherein the operations further comprise:
analyzing the cache request; and
determining the load balancing program from a plurality of load balancing programs based at least in part on the analyzing.

* * * * *

UNITED STATES PATENT AND TRADEMARK OFFICE
CERTIFICATE OF CORRECTION

| | | |
|---|---|---|
| PATENT NO. | : 9,158,593 B2 | Page 1 of 1 |
| APPLICATION NO. | : 13/885394 | |
| DATED | : October 13, 2015 | |
| INVENTOR(S) | : Kurabayashi | |

It is certified that error appears in the above-identified patent and that said Letters Patent is hereby corrected as shown below:

In the specification

In Column 1, Line 7, delete "§371" and insert -- § 371 --, therefor.

In Column 5, Line 47, delete "TP address" and insert -- IP address --, therefor.

Signed and Sealed this
Twenty-third Day of February, 2016

Michelle K. Lee
*Director of the United States Patent and Trademark Office*